S. HANSON.
DISPENSING MACHINE.
APPLICATION FILED SEPT. 17, 1917.
1,431,582.
Patented Oct. 10, 1922.
3 SHEETS—SHEET 1.
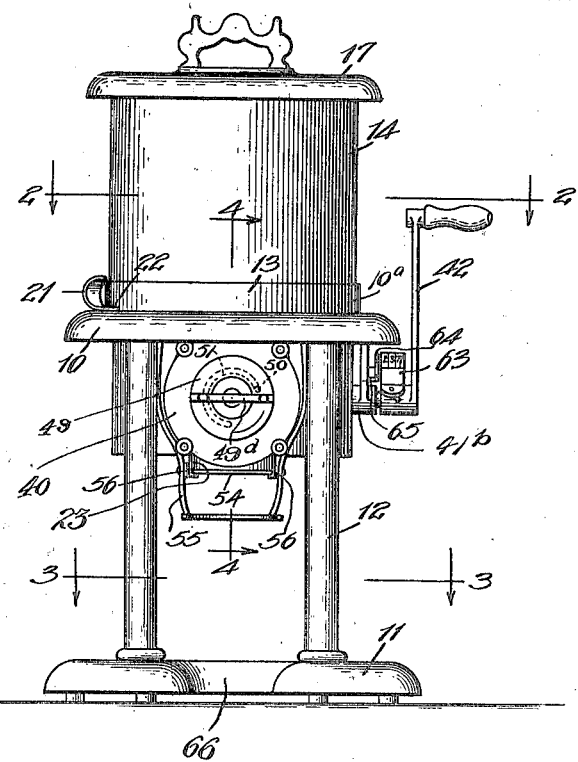
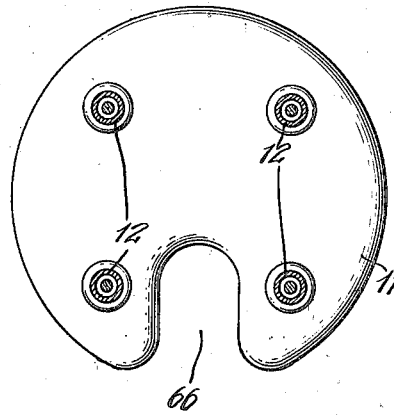
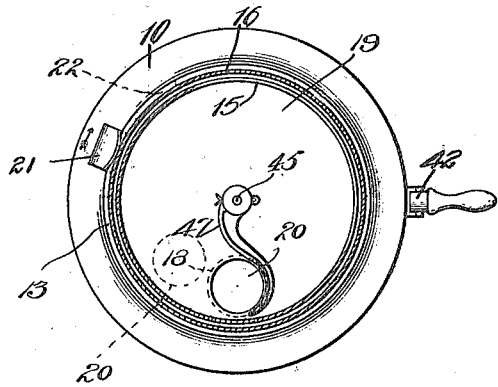
Witnesses:
W. F. Kilroy
Harry R. L. White
Inventor:
Sigvort Hanson.
By Barnett Trueman
Attys.

S. HANSON.
DISPENSING MACHINE.
APPLICATION FILED SEPT. 17, 1917.

S. HANSON.
DISPENSING MACHINE.
APPLICATION FILED SEPT. 17, 1917.

1,431,582.

Patented Oct. 10, 1922.
3 SHEETS—SHEET 3.

Witnesses:
W. J. Kilroy
Harry R. L. White

Inventor:
Sigvart Hanson
By Barnett Brunson
Attys.

Patented Oct. 10, 1922.

1,431,582

UNITED STATES PATENT OFFICE.

SIGVORT HANSON, OF RACINE, WISCONSIN, ASSIGNOR TO RACINE DISPENSING MANUFACTURING COMPANY, OF RACINE, WISCONSIN, A CORPORATION OF WISCONSIN.

DISPENSING MACHINE.

Application filed September 17, 1917. Serial No. 191,788.

*To all whom it may concern:*

Be it known that I, SIGVORT HANSON, a citizen of the United States, residing at Racine, in the county of Racine and State of Wisconsin, have invented certain new and useful Improvements in Dispensing Machines, of which the following is a specification.

My invention relates to machines for dispensing materials in measured quantities and more particularly to the type of machine adapted to dispense pulverulents which are hygroscopic or sticky in their character, such, for example, as malted milk powder. The invention more particularly relates to certain improvements in a machine of this character described and claimed in my United States Letters Patent 1,211,577, issued January 9, 1917.

The primary object of the invention is to provide an improved dispensing machine suitable for dispensing malted milk powder or other pulverulent materials likely to be affected by dampness in a manner to cause the material to cake or cling to the walls of the storage vessel or to stick to the operating parts of the device in a manner to interfere with the proper operation thereof.

With this object in view, the invention contemplates a structure which will prevent the material from being subjected to the moistening action of the atmosphere and also the provision of a storage vessel which is so formed as to prevent the air in the vessel from condensing and thereby prevent the collection of moisture upon the inner walls of the storage vessel.

Another object of the invention is to provide an improved measuring member or drum which may be supported at opposite sides when in its operative position and which may be readily and conveniently removed from the device when it is desired to clean the discharge mechanism without affecting the other operating parts of the device.

Another object of the invention is to provide, in a machine of this character, new and improved means of varying the capacity of the measuring element, which consists of a minimum number of parts and which will be reliable in its operation.

Another object of the invention is to provide, in a machine of this character, a novel valve mechanism for closing the lower end of the discharge chute which is opened by moving a glass into a position to receive the material discharged. In this connection the invention also contemplates the provision of a suitable locking device which cooperates with the above valve mechanism in a manner to prevent material from being discharged into the lower part of the discharge chute when the above valve mechanism is in closed position.

Another object of the invention is to provide, in a machine of this character, a novel valve structure which may be operated to open or close the discharge passage leading from the storage vessel without exposing to the atmosphere the surfaces of said valve which contact with the material.

The invention consists in the novel arrangement, construction and combination of parts hereinafter described and claimed for carrying out the above stated objects and such other objects as may appear from the following description.

The preferred embodiment of my invention is illustrated in the accompanying drawings wherein like characters of reference designate like parts, and wherein—

Figure 1 is a front elevation of a dispensing machine constructed in accordance with my invention;

Fig. 2 is a sectional plan view taken on line 2—2 of Fig. 1;

Fig. 3 is a sectional plan taken on line 3—3 of Fig. 1 illustrating the configuration of the base member;

Figure 4:
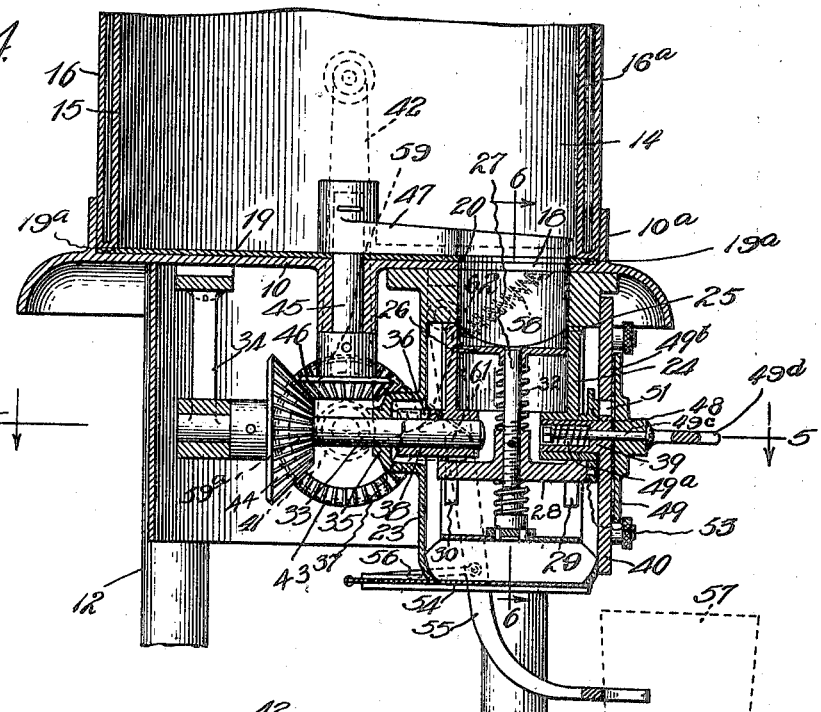
Fig. 4 is a fragmentary vertical sectional view taken on line 4—4 of Fig. 1 looking in the direction indicated by the arrows.

Referring to the drawings, 10 is a table supported on a base 11 by legs 12. The table is formed with an upstanding flange 13 adapted to retain a storage vessel 14. This vessel consists of a cylinder formed with inner and outer walls 15 and 16 respectively, spaced apart to provide a dead air space 16ª extending around the vessel. The dead air space constitutes a means of insulating the inner wall from the influence of the external temperature and thereby prevents the collection of moisture, due to the condensation of air in the vessel, upon the inner wall 15. The upper end of the cylinder is closed by a lid 17 which may obviously be made with a double wall, if desired, for accomplishing the same results referred to in connection with the double-walled cylinder 14. The table 10 is provided with an opening 18 through which the material passes from the storage vessel 14 to a measuring element hereinafter described. 19 designates a disc valve which constitutes the bottom of the storage vessel and is formed with a discharge opening 20 adapted to register with the opening 18. The periphery of the disc 19 preferably extends under the lower edge of the cylinder 14, as indicated at 19ª (Fig. 4), and is formed with a suitable operating handle 21 which projects through a slot 22 in the flange 13 (Figs. 1 and 2). When it is desired to close the discharge opening 18, the handle 21 of the disc valve is moved in the direction indicated by the arrow in Fig. 2. This movement rotates the disc 19 so as to move the aperture 20 therein to the position indicated in dotted lines in Fig. 2. The lower end of the cylinder 14 preferably fits tightly against the upper surface of the valve 19 so as to frictionally hold the valve in its open or closed position and to also prevent any of the material in the vessel 14 from working out through the slot 22. In dispensing machines adapted to dispense malted milk or other hygroscopic pulverulent materials which contain sugar, for example, and which will absorb sufficient moisture from the atmosphere to make it sticky in character, it is desirable to prevent any part of the machine coming in contact with the material from being exposed to the atmosphere for any appreciable length of time. When such parts are exposed the surfaces become sticky and thereby collect dust and also attract flies and other insects in a manner to make an unsightly and unsanitary appearance.

A discharge chute 23 is secured to the under surface of the table 10 in a position to communicate with the discharge opening 18. A revoluble measuring element is supported in the chute 23 and consists of a drum 24 having, preferably, an annular measuring pocket 25 formed therein which, in the normal position of the drum is in filling position under the discharge opening 18. The bottom 26 of the measuring pocket is movable and consists of a disc provided with a downwardly projecting stem 27 which carries at its lower end a cross-head 28. This cross-head operates in guides 29, 29 and 30, 30 formed on the drum 24 and holds the bottom 26 and stem 27 at right angles to the axis of the drum. The bottom of the measuring pocket 25 is forced outwardly by means of the springs 31, 32, which are compressed when the bottom is in its retracted position, as will be hereinafter described.

Figure 6:
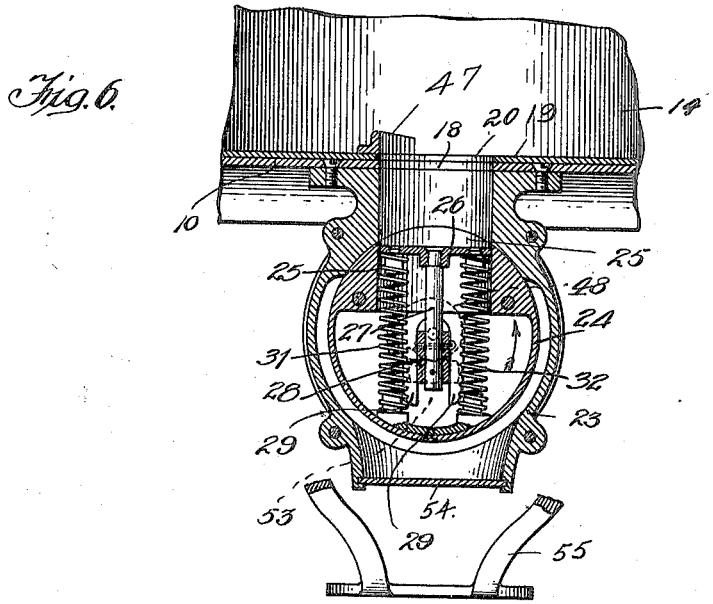
Fig. 6 is a fragmentary sectional view taken on line 6—6 of Fig. 4, looking in the direction indicated by the arrows.

The material in the measuring pocket is discharged by revolving the drum to an inverted position from that shown in Figs. 4 and 6 of the drawings. The drum may be revolved by any suitable mechanism. In the preferred embodiment of the invention shown in the drawings, 33 is a shaft, one end of which is supported by a hanger 34. The other end of this shaft extends into the interior of the discharge chute 23 and is supported by the bearing 35. This end of the shaft 33 supports one side of the drum 24 and is provided with a pin 36 which fits into a slot 37 in one side of the hub 38 of the drum (Fig. 4) so as to provide a detachable connection with the drum. The other side of the drum is supported by a boss 39 on the removable front plate 40 of the discharge chute. 41 is a shaft suitably supported in bearings 41ª, 41ᵇ extending transversely of the shaft 33 and carrying at its outer end an operating crank 42. The inner end of this shaft is provided with a bevel gear 43 which meshes with a bevel gear 44 on the shaft 33. 45 designates a vertical shaft which is supported in a bearing on the table 10 and which carries a bevel gear 46 (Fig. 4) adapted to mesh with the gear 44. The upper end of this shaft extends into the storage vessel and carries a sweep 47.

Figure 7:
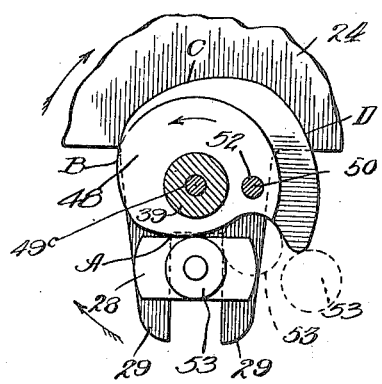
Fig. 7 is a fragmentary view in elevation of the front of the measuring drum and also illustrating the normal position of the cam employed in my invention for varying the capacity of the measuring element. Certain members in said figures are shown in section for the purpose of clearness.

For the purpose of providing means whereby the capacity of the measuring pocket 25 of the drum 24 may be varied to discharge a measured quantity of material to suit any particular requirement, I have provided a suitable means for adjusting the position of the bottom 26 and for holding said bottom in such adjusted position during the filling operation. This means, in the preferred embodiment, consists of a snail cam 48 loosely mounted on the boss 39 of the front plate 40. The periphery of this cam is divided into a plurality of bearing surfaces or spaces A, B, C and D (Fig. 7) having contours which differ in their distance from the axis of rotation of the drum 24 and which correspond respectively to predetermined positions at which the bottom 26 of the measuring pocket is held during the filling operation. 49 designates a revoluble plate on the front plate 40, and 50 a pin carried by the revoluble plate. This pin projects through a curved slot 51 in the front plate 40 and enters an aperture 52 in the cam 48. 49$^a$ is a suitable handle on the plate 49 for adjusting the position of said plate and cam 48. By revolving the plate 49 in a reverse clock-wise direction, the snail cam will be rotated in the direction indicated by the unfeathered arrow in Fig. 7. By this movement of the cam the bearing surfaces A, B, C or D may be moved into a position to bear against the roller 53 on the cross-head 28 when the measuring element is in its filling position and thereby hold the bottom 26 of the measuring pocket in the necessary retracted position to correspond to the volume desired to be measured. The cam 48 is frictionally held in any adjusted position by means of a coiled spring 49$^a$ which surrounds the bolt 49$^c$ and exerts a spring pressure which draws the plate 49 tightly against the outer surface of the plate 40. The friction for holding the said cam in any desired position may be increased if desired by the insertion of a gasket 49$^b$ of soft material between the plates 40 and 49. As the measuring element is revolved in the direction indicated by the feathered arrows in Figs. 6 and 7, roller 53 will ride on the periphery of the cam 49 and draw the bottom 26 of the measuring pocket inwardly until the roller 53 rides off the end of the cam 48, as indicated in dotted lines in Fig. 7. The springs 31, 32, being previously compressed, will then be released and force the bottom outwardly in a manner to discharge the material from the measuring pocket.

In order to protect the interior of the discharge chute 23 from moisture and to make the device more sanitary, I preferably provide a valve mechanism for closing the lower end of the discharge chute after the discharge of each measured quantity of material from the machine. This mechanism consists of a slide valve 54 which operates in suitable guideways formed in the lower end of the discharge chute, and a pivoted operating lever 55 connected to the valve by connecting links 56. The valve 54 is preferably opened by forcing the operating lever 55 back as a receiving receptacle, such, for example, as the glass 57 is moved into a position to receive the quantity of material to be discharged. The valve is closed by the action of the spring 58 connected to the operating lever 55 and to the under side of the table 10.

Figure 5:
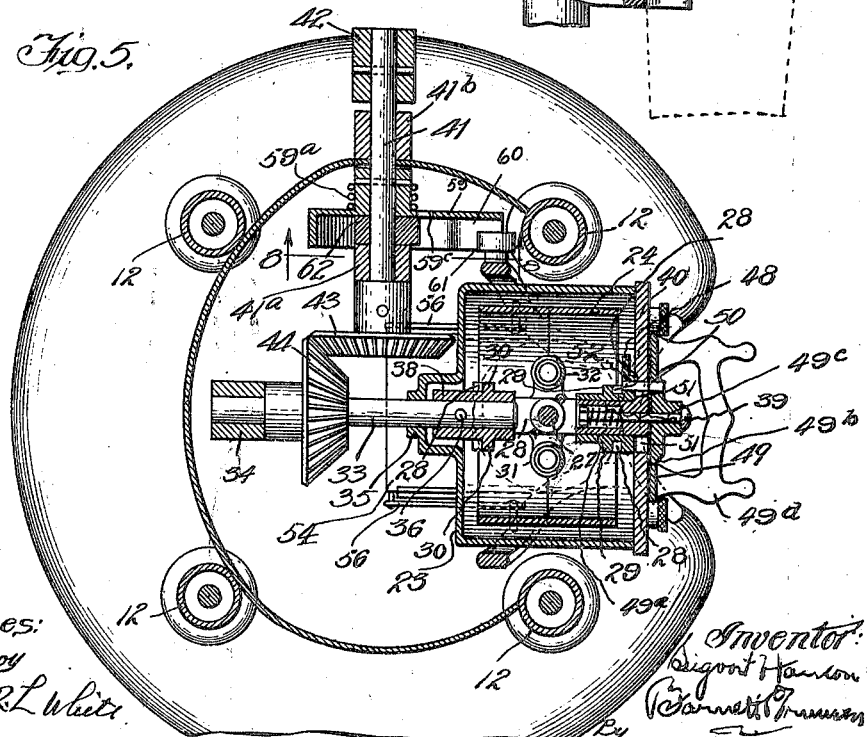
Fig. 5 is a sectional plan taken on line 5—5 of Fig. 4.
Figure 8:
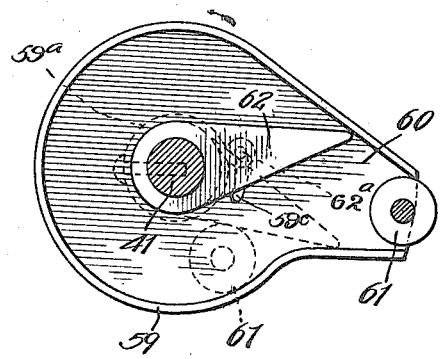
Fig. 8 is a sectional view taken on line 8—8 of Fig. 5 illustrating my preferred means of locking the measuring element in its normal position.

The measuring element is preferably locked against any revoluble movement while the slide valve 54 is closed by means of the locking element 59. This element consists preferably of a box cam secured to the shaft 41 and formed with a neck 60 adapted to receive a roller 61 on the slide valve operating lever 55 (Figs. 4, 5 and 8). A dog 62 is pivoted on the shaft 41 within the flanges of the box cam and is held in its normal position (indicated in full lines in Fig. 8) by means of a coiled spring 59$^a$, one end of which is secured to the hub of the box cam and the other end is secured to a pin 62$^a$ which is screwed into the side of the dog 62 and projects through a slot 59$^c$ in the box cam. When the measuring element 24 and shaft 41 is rotated in the direction indicated by the feathered arrows in Figs. 6, 7 and 8, the spring actuated dog 62 operates to direct the roller into the neck 60 of the box cam after each complete revolution of the measuring element 24 and shaft 41.

The storage vessel in my preferred embodiment is preferably designed to contain a fixed quantity of material and in order to ascertain at any time the number of measured quantities which have been dispensed from the machine, I preferably provide an indicating mechanism 63. This mechanism may be of any well known construction and is illustrated in the drawings as consisting of a computing mechanism secured to the hub of the operating crank 42 and provided with a star wheel 64 which is adapted to engage a stud 65 on a stationary part of the machine, for example, on the bracket 41$^b$, so as to move the star wheel a one-quarter turn for each revolution of the operating crank. This movement of the star wheel causes the computing mechanism to register one point for each measured quantity of material discharged from the machine. The operation of the machine is as follows:

After the cam 48 has been moved in the manner above described to the desired position to adjust the bottom 26 of the pocket 25 so that the machine will deliver the desired volume of material, the attendant may open the valve 54 by sliding the glass 57, for example, into the recess 66 in the base 11. This moves the valve 54 into its open position and also moves the roller 61 on the valve operating lever 65 into the position indicated in the dotted lines in Fig. 8. When the roller 61 has been moved to the latter position, the crank 42 may be turned to revolve the measuring element 24 in the direction indicated by the feathered arrow in Figs. 6 and 7 to make one complete revolution. As the measuring element revolves as above indicated, the roller 53 rides off the end of the cam 48 and releases the bottom 26 from its retracted position. The coil springs 31, 32 then force the bottom 26 outwardly so as to expel the material from the measuring pocket 25. The measuring element continues to revolve and as it approaches its normal position, that is, the filling position, the spring dog 62 in the box cam 59 will engage the roller 61. The dog 62 at this point is forced down against the tension of the spring 59ᵃ to the position indicated in dotted lines in Fig. 8 and passes the spring 58 (Fig. 4) to close the slide valve 54 and force the roller 61 into the neck 60 of the cam 59. When the roller 61 is in this position, the measuring element 24 cannot be revolved until the valve 54 has again been opened in the manner above set forth.

While I have described my invention in its preferred embodiment, it will be understood that modifications might be made without departing from the spirit of my invention. It will, therefore, be understood that I do not wish to limit my invention to the particular construction, arrangement and devices shown and described, except so far as specific limitations may appear in the appended claims.

I claim:

1. In a dispensing machine, a revoluble measuring element having a pocket formed therein and provided with guides, a reciprocating bottom fitted in said pocket and provided with a centrally arranged stem, a cross head secured to said stem and operating in said guides to hold said bottom in operative position, an anti-friction roller on said cross head, a cam engaging said roller, and adapted to be set to hold said bottom in various retracted positions so as to vary the capacity of said pocket, and means for frictionally holding said cam in said set position.

2. In a dispensing machine, the combination with a storage vessel having a discharge opening in the bottom thereof, of a discharge chute arranged over said discharge opening, and having an opening in one side thereof, a cover plate for closing said side opening, a revoluble measuring element in said chute supported at one side by the wall of said chute and on the under side by said cover plate, driving means for revolving said measuring element, and means for detachably connecting said element to said driving means to permit said element to be removed from said chute.

3. In a dispensing machine, the combination with a storage vessel having a discharge opening in the bottom thereof, of a discharge chute arranged over said discharge opening and having an opening in one side thereof, a cover plate for closing said side opening, a revoluble measuring element in said chute supported at one side by the wall of said chute and on the opposite side by said cover plate, driving means for revolving said measuring element, means for detachably connecting said element to said driving means to permit said element to be removed from said chute, and a disc valve adapted to close the said discharge opening in said storage vessel.

4. In a dispensing machine, the combination with a storage vessel adapted to hold the material to be dispensed and formed with a discharge opening in the bottom thereof, of a discharge chute communicating with said opening, a revoluble measuring element arranged in said chute and adapted to segregate a portion of said material and subsequently discharge the same, driving mechanism for revolving said measuring element, a valve for closing the lower end of said chute, and means connecting said valve and said driving mechanism whereby said measuring element is locked against rotation when the said valve is closed.

5. In a dispensing machine, the combination with a storage vessel adapted to hold the material to be dispensed and formed with a discharge opening in the bottom thereof, of a discharge chute communicating with said opening, a revoluble measuring element arranged in said chute and adapted to segregate a portion of said material and subsequently discharge the same, driving mechanism for revolving said measuring element, a slide valve for closing the lower end of said chute, and means connecting said valve and said driving mechanism whereby said measuring element is locked against rotation when the said valve is closed.

6. In a dispensing machine, the combination with a storage vessel adapted to hold the material to be dispensed and formed with a discharge opening in the bottom thereof, of a discharge chute communicating with said opening, a revoluble measuring element arranged in said chute and adapted to segregate a portion of said material and subsequently discharge the same, driving mechanism for revolving said measuring element, a slide valve for closing the lower end of said chute, and means connecting said valve and said driving mechanism whereby said measuring element is locked in its normal position when the said valve is closed.

7. In a dispensing machine, the combination with a storage vessel adapted to hold the material to be dispensed and formed with a discharge opening in the bottom thereof, of a discharge chute communicating with said opening, a revoluble measuring element arranged in said chute and adapted to segregate a portion of said material and subsequently discharge the same, driving mechanism for revolving said measuring element, a slide valve for closing the lower end of said chute, and means connecting said valve and said driving mechanism whereby said measuring element is locked in its filling position when the said valve is closed.

8. In a dispensing machine, the combination with a storage vessel adapted to hold the material to be dispensed and formed with a discharge opening in the bottom thereof, of a discharge chute communicating with said opening, a revoluble measuring element arranged in said chute and adapted to segregate a portion of said material and subsequently discharge the same, driving mechanism for revolving said measuring element, a slide valve for closing the lower end of said chute, and spring actuated means connecting said valve and said driving mechanism whereby said measuring element is locked in its filling position when the said valve is closed.

9. In a dispensing machine, the combination with a vessel adapted to contain material to be dispensed, a discharge chute communicating with the interior of said vessel, a revoluble measuring element adapted to segregate a portion of said material and subsequently discharge the same, valve mechanism for closing said discharge chute, and means associated with said valve mechanism to limit the operation of said measuring element to one revolution during each period that the said valve is open.

10. In a dispensing machine, the combination with a vessel adapted to contain material to be dispensed, a discharge chute communicating with the interior of said vessel, a revoluble measuring element adapted to segregate a portion of said material and subsequently discharge the same, driving mechanism for revolving said element, valve mechanism for closing said discharge chute comprising a slide valve, a pivoted lever and means connecting said pivoted lever with said valve, and means associated with said valve mechanism to limit the operation of said measuring element to one revolution during each period that the said valve is open, comprising a box cam formed with a neck portion and connected with said driving mechanism, an anti-friction roller on said pivoted lever adapted to project into said cam, and a spring actuated dog adapted to direct said roller into the neck portion of said cam as the measuring element approaches its filling position.

SIGVORT HANSON.